(12) United States Patent
Hong et al.

(10) Patent No.: US 11,837,765 B2
(45) Date of Patent: *Dec. 5, 2023

(54) CUTTING APPARATUS AND METHOD OF MANUFACTURING MEA FOR FUEL CELL

(71) Applicants: Hyundai Motor Company, Seoul (KR); Kia Motors Corporation, Seoul (KR)

(72) Inventors: Yoosuk Hong, Yongin-si (KR); Sung Hoon Jeong, Seoul (KR)

(73) Assignees: Hyundai Motor Company, Seoul (KR); Kai Motors Corporation, Seoul (KR)

( * ) Notice: Subject to any disclaimer, the term of this patent is extended or adjusted under 35 U.S.C. 154(b) by 1103 days.

This patent is subject to a terminal disclaimer.

(21) Appl. No.: 16/436,217

(22) Filed: Jun. 10, 2019

(65) Prior Publication Data

US 2020/0153016 A1    May 14, 2020

(30) Foreign Application Priority Data

Nov. 13, 2018 (KR) .................. 10-2018-0139338

(51) Int. Cl.
*H01M 8/1004* (2016.01)
*B26F 1/44* (2006.01)
(Continued)

(52) U.S. Cl.
CPC .......... *H01M 8/1004* (2013.01); *B26D 5/007* (2013.01); *B26F 1/40* (2013.01); *B26F 1/44* (2013.01)

(58) Field of Classification Search
CPC ......... B26D 7/0633; B26D 5/007; B26F 1/40; B26F 1/44
(Continued)

(56) References Cited

U.S. PATENT DOCUMENTS 5,701,791 A * 12/1997 Schulze ................. B21D 28/04
83/412
6,145,424 A * 11/2000 Matsuda ................. B26F 1/405
83/437.4
(Continued)

FOREIGN PATENT DOCUMENTS

CN           1646276 A      7/2005
CN        103050578 A      9/2015
(Continued)

*Primary Examiner* — Jonathan G Riley
(74) *Attorney, Agent, or Firm* — MORGAN, LEWIS & BOCKIUS LLP

(57) ABSTRACT

A cutting apparatus of membrane electrode assembly for a fuel cell may include a cutting press including a cutting die disposed on a lower side of the feeding path and a driving cutter configured to be upwardly and downwardly movable on the cutting die at an upper side of the feeding path, and the cutting press disposed to a facility frame, a plurality of gripper modules disposed on the facility frame through a base member along a feeding direction of the membrane-electrode assembly sheet, and gripping both side edges of the membrane-electrode assembly sheet and a gripper driving unit disposed in the facility frame and moving the base member in a direction perpendicular to the feeding direction of the membrane-electrode assembly sheet and along the feeding direction of the membrane-electrode assembly sheet.

5 Claims, 10 Drawing Sheets

(51) Int. Cl.
  *B26F 1/40* (2006.01)
  *B26D 5/00* (2006.01)
(58) Field of Classification Search
  USPC .................................................. 83/206, 277
  See application file for complete search history.

(56) References Cited

U.S. PATENT DOCUMENTS

| | | | | |
|---|---|---|---|---|
| 10,128,521 | B2* | 11/2018 | Jeong | ............... H01M 8/0273 |
| 2003/0159559 | A1* | 8/2003 | Hoffmann | ............... B26D 1/08 |
| | | | | 83/277 |
| 2003/0188616 | A1 | 10/2003 | Behymer | |
| 2007/0214924 | A1* | 9/2007 | Jourdan | ............... B27B 31/08 |
| | | | | 83/277 |
| 2017/0008200 | A1* | 1/2017 | Jeong | ............... B30B 15/0035 |
| 2017/0069926 | A1* | 3/2017 | Jeong | ............... H01M 8/0273 |
| 2018/0257312 | A1* | 9/2018 | Fukushima | ............... B26F 1/02 |
| 2020/0153016 | A1* | 5/2020 | Hong | ............... B26D 5/007 |
| 2020/0153017 | A1* | 5/2020 | Hong | ............... H01M 8/1006 |
| 2021/0135245 | A1* | 5/2021 | Cisar | ............... H01M 8/2404 |
| 2022/0131169 | A1* | 4/2022 | Hong | ............... H01M 8/04731 |

FOREIGN PATENT DOCUMENTS

| | | | |
|---|---|---|---|
| CN | 105666584 A | 6/2016 | |
| CN | 106078917 A | 11/2016 | |
| CN | 206048367 U | 3/2017 | |
| CN | 106736808 A | 5/2017 | |
| CN | 108054414 A | 5/2018 | |
| CN | 105552387 A | 10/2020 | |
| CN | 106505212 A | 8/2021 | |
| KR | 10-1575312 B1 | 12/2015 | |
| KR | 10-1703617 B1 | 2/2017 | |
| KR | 10-1703618 B1 | 2/2017 | |
| WO | WO-2019125039 A1 * | 6/2019 | ........... B65H 23/028 |

* cited by examiner (a)

(b)

CUTTING APPARATUS AND METHOD OF MANUFACTURING MEA FOR FUEL CELL

CROSS-REFERENCE TO RELATED APPLICATION

The present application claims priority to Korean Patent Application No. 10-2018-0139338 filed on Nov. 13, 2018, the entire contents of which is incorporated herein for all purposes by this reference.

BACKGROUND OF THE INVENTION

Field of the Invention

The present invention relates to a system for manufacturing membrane-electrode assemblies (MEAs) for fuel cells. More particularly, the present invention relates to a method and apparatus for cutting a membrane-electrode assembly sheet into a unit-type membrane-electrode assembly for a fuel cell.

Description of Related Art

As is known, a fuel cell produces electricity by reaction, which is an electrochemical reaction of hydrogen and oxygen. Such a fuel cell is characterized in that it can continuously generate electricity by supplying chemical reactants from the outside without a separate charging process.

The fuel cell may be constructed by disposing a separating plate or a bipolar plate on both sides of a membrane-electrode assembly (MEA).

In the membrane-electrode assembly, an anode layer and a cathode layer are transferred as electrode catalyst layers on both sides of a polymer membrane through which hydrogen ions migrate. The membrane-electrode assembly is combined with a sub gasket for protecting the electrode catalyst layer and the electrolyte membrane, and securing the ease of assembly of the fuel cell.

The membrane-electrode assembly is manufactured by unwinding an electrolyte membrane wrapped in a roll form, releasing a release paper wrapped in a roll form, passing the electrolyte membrane and the release paper between the roll presses and discharging the electrode catalyst layer on both sides of the electrolyte membrane at a high temperature and a high pressure, and thereby producing a bonded electrode film sheet As such, the sub-gasket wound in a form of a roll is unwound and positioned on both sides of the electrode membrane sheet, and these are passed between hot rollers to produce a membrane-electrode assembly sheet in which the edge of the electrode membrane sheet and the sub gasket are bonded.

After the present process, the membrane-electrode assembly sheet wound in a roll form is unscrewed and the membrane-electrode assembly sheet is cut into a unit form including an electrode catalyst layer, completing the manufacture of the membrane-electrode assembly.

On the other hand, the process of cutting the unit-type membrane-electrode assembly including the electrode catalyst layer at the membrane-electrode assembly sheet is performed through a cutting press. The cutting press may include a cutting die for supporting the membrane-electrode assembly sheet along a set feeding path, and a driving cutter movably disposed in the vertical direction on the cutting die.

Thus, in the membrane-electrode assembly cutting process, the membrane-electrode assembly is transferred between the cutting die and the driving cutter, and the membrane-electrode assembly sheet is cut on the fixed die through the driving cutter to produce a membrane-electrode assembly of a predetermined size.

In the membrane-electrode assembly cutting process of the related art, there is a difficulty in cutting the membrane-electrode assembly sheet to a predetermined size due to minute vibration or shaking of the membrane-electrode assembly sheet when the membrane-electrode assembly is transferred.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method and apparatus configured for cutting a membrane-electrode assembly for a fuel cell, which can prevent micro-vibration or shaking due to the transfer of the membrane-electrode assembly.

Furthermore, various exemplary embodiments of the present invention provide a method and apparatus configured for cutting a membrane-electrode assembly for a fuel cell, which can automatically correct a cutting position of a membrane-electrode assembly according to a location of a catalyst layer on the membrane-electrode assembly sheet.

A cutting apparatus of membrane electrode assembly for a fuel cell according to an exemplary embodiment of the present invention is configured to a facility transferring a membrane electrode assembly sheet including an electrolyte membrane, electrode catalyst layers bonded to both surfaces of the electrolyte membrane and sub gaskets attached to the electrolyte membrane and edges of the electrode catalyst layers in a roll-to-roll manner along a feeding path and cuts the membrane-electrode assembly sheet to produce a unit-type membrane-electrode assembly. The cutting apparatus may include a cutting press including a cutting die disposed on a lower side of the feeding path and a driving cutter configured to be upwardly and downwardly movable on the cutting die at an upper side of the feeding path, and the cutting press disposed to a facility frame, a plurality of gripper modules disposed on the facility frame through a base member along a feeding direction of the membrane-electrode assembly sheet, and gripping both side edges of the membrane-electrode assembly sheet and a gripper driving unit disposed in the facility frame and moving the base member in a direction perpendicular to the feeding direction of the membrane-electrode assembly sheet and along the feeding direction of the membrane-electrode assembly sheet.

The gripper module may include a stationary gripper body fixedly mounted on the base member and an operating gripper body coupled to a first operating cylinder mounted on the base member and selectively gripping the edges of the membrane-electrode assembly sheet together with the stationary gripper body.

The stationary gripper body and the operating gripper body may be formed in an shape of rectangular plate and be disposed along the feeding direction thereof.

A gripping protrusion and a gripping groove for gripping both side edge portions of the membrane-electrode assembly sheet in a stepped manner may be formed at the stationary gripper body and the operating gripper body respectively.

Supporting protrusions for supporting both side edge portions of the membrane-electrode assembly sheet may be formed at the stationary gripper body and the operating gripper body respectively.

The support protrusions may be formed at predetermined intervals along a direction perpendicular to the feeding direction of the membrane electrode assembly sheet.

The gripper driving unit may include a servo motor fixedly mounted on a mounting bracket disposed along the feed direction in a facility frame, a leadscrew connected to the servo motor, a moving block which is engaged with the lead screw and slidably coupled with the base member in 65 in a direction perpendicular to the feeding direction of the membrane-electrode assembly sheet, a guide block fixedly mounted on the mounting bracket and slidably coupled with the moving block along the feeding direction of the membrane-electrode assembly sheet and a second operating cylinder fixed to the moving block via a fixed bracket, connected to the base member, and applying a forward and backward actuating force to the base member in a direction perpendicular to the feeding direction thereof.

The base member may be slidably coupled to the moving block through a guide rail in a direction perpendicular to the feeding direction thereof.

A cutting apparatus of membrane electrode assembly for a fuel cell according to an exemplary embodiment of the present invention is configured to a facility transferring a membrane electrode assembly sheet including an electrolyte membrane, electrode catalyst layers bonded to both surfaces of the electrolyte membrane and sub gaskets attached to the electrolyte membrane and edges of the electrode catalyst layers in a roll-to-roll manner along a feeding path and cuts the membrane-electrode assembly sheet to produce a unit-type membrane-electrode assembly. The cutting apparatus may include a cutting press including a cutting die disposed on a lower side of the feeding path and a driving cutter configured to be upwardly and downwardly movable on the cutting die at an upper side of the feeding path, and the cutting press disposed to a facility frame, a plurality of gripper modules disposed on the facility frame to be movable along a direction perpendicular to a feeding direction of the membrane-electrode assembly sheet and the feeding direction of the membrane-electrode assembly sheet, and gripping both side edge of the membrane-electrode assembly sheet, a vision sensor unit disposed in the facility frame to reciprocate the inside and outside of the cutting die and the driving cutter, detecting a position of the electrode catalyst layer and outputting a detection signal to a controller and a position aligning unit disposed in the facility frame to be connected to the cutting die, the position aligning unit changing a position of the cutting press according to the position of the electrode catalyst layer detected by the vision sensor unit.

The cutting apparatus may further include a driving unit, and wherein the vision sensor unit may be configured to be reciprocally movable along the feeding direction of the membrane-electrode assembly sheet through the driving unit.

The position aligning unit may include an UVW stage, which is connected to the cutting die through the base plate and aligns the base plate on XY plane in a X-axis direction, a Y-axis direction and rotates about a Z-axis direction perpendicular to the XY plane.

The controller may analyze the sensing signal provided from the vision sensor unit to detect the position of the electrode catalyst layer and the controller may apply a control signal to the position aligning unit when it is determined that the detected position of the electrode catalyst layer is not within a predetermined reference range.

The cutting apparatus may further include a protective film supply unit disposed in the facility frame and supplying a protective film between the cutting die and the membrane-electrode assembly sheet.

The protective film supply unit may include a film unwinder for unwinding the protective film wound in a roll form between the cutting die and the membrane-electrode assembly sheet, a film rewinder for winding a protective film that has passed between the cutting die and the membrane electrode assembly sheet and a plurality of guide rollers for guiding the protective film between the cutting die and the membrane electrode assembly sheet.

A cutting method of the cutting apparatus of the membrane-electrode assembly for a fuel cell according to an exemplary embodiment of the present invention may include (a) supplying a membrane-electrode assembly sheet between the cutting die and the driving cutter of the cutting press, (b) gripping both edge portions of the membrane-electrode assembly the through the gripper module on the front side of the cutting press and applying tension to the membrane-electrode assembly sheet, (c) moving the membrane-electrode assembly along the feed direction of the membrane-electrode assembly sheet through the gripper module, positioning the gripping portion of the membrane-electrode assembly sheet between the cutting die and the driving cutter, (d) moving the vision sensor unit between the cutting die and the driving cutter, detecting the position of the electrode catalyst layer of the membrane-electrode assembly sheet through the vision sensor unit and outputting the detection signal to the controller, (e) operating the position aligning unit through the controller according to the detection signal of the vision sensor unit, and correcting the position of the cutting press and (f) cutting the membrane-electrode assembly sheet into a unit-type membrane-electrode assembly through the driving cutter;

Prior to the step (f), the protective film may be supplied between the cutting die and the membrane-electrode assembly sheet via the protective film supply unit.

In the step (d), the electrode catalyst layer may be visually photographed through the vision sensor unit, and the vision data is output to the controller.

The controller may analyze the vision data provided from the vision sensor unit to detect the position of the electrode catalyst layer and the controller may apply a control signal to the position aligning unit when it is determined that the position of the electrode catalyst layer is not within a predetermined reference range.

In the step (e), the position aligning unit may align the cutting press on XY plane in X-axis direction thereof, Y-axis direction and rotates about a Z-axis direction perpendicular to the XY plane through a UVW stage.

The cutting method may further include cutting and discharging scrap of the membrane-electrode assembly, and visually inspecting the membrane-electrode assembly cut by the cutting press after the (f) step.

In the exemplary embodiments of the present invention, since the tension is applied to the membrane-electrode assembly sheet through the gripper module, it is possible to prevent the micro vibration or the shaking due to the transfer of the membrane-electrode assembly sheet.

Also, in the exemplary embodiments of the present invention, the cutting position of the cutting press is automatically corrected according to the position of the electrode catalyst layer at the membrane-electrode assembly sheet through the vision sensor unit and the position aligning unit, and the membrane-electrode assembly may be cut to a set size.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
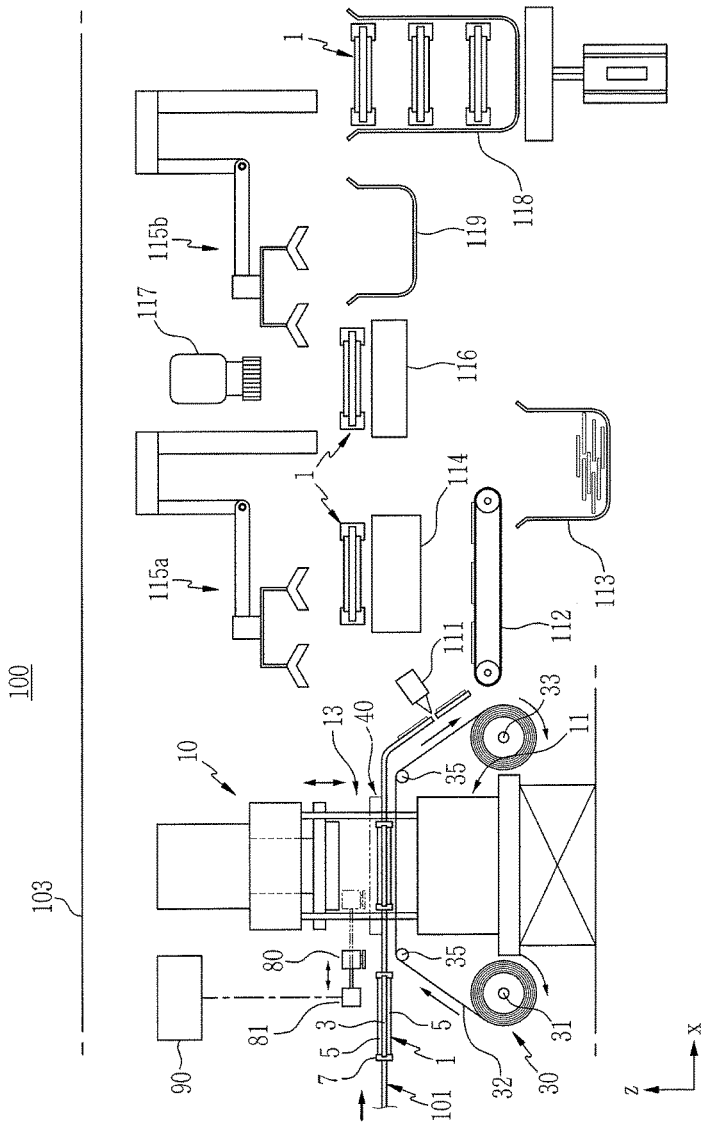
FIG. 1 is a schematic diagram illustrating a cutting apparatus configured for a fuel cell membrane-electrode assembly according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Exemplary embodiments of the present application will be described more fully hereinafter with reference to the accompanying drawings, in which exemplary embodiments of the present invention are shown. As those skilled in the art would realize, the described embodiments may be modified in various different ways, all without departing from the spirit or scope of the present invention.

To clearly illustrate the present invention, portions not related to the description are omitted, and the same or similar components are denoted by the same reference numerals throughout the specification.

Since the size and thickness of each configuration shown in the drawing are arbitrarily shown for convenience of explanation, the present invention is not necessarily limited to the one shown in the drawing, but the thickness is enlarged to clearly represent the various portions and regions.

In the following detailed description, the names of components are categorized into the first, second, and the like to distinguish the components from each other in the same relationship, and are not necessarily limited to the order in the following description.

It is to be understood that throughout the specification, unless otherwise indicated, all such modifications as may be made will be apparent to one of ordinary skill in the art without departing from the scope of the present invention.

Furthermore, the terms " . . . unit", " . . . means", " . . . part", etc. In the specification are defined as a unit of at least one function or action, it means.

FIG. 1 is a schematic diagram illustrating a cutting apparatus configured for a fuel cell membrane-electrode assembly according to an exemplary embodiment of the present invention.

Referring to FIG. 1, a cutting apparatus 100 of a membrane-electrode assembly for a fuel cell according to an exemplary embodiment of the present invention may be applied to an automation system that automatically and continuously manufactures portions of unit fuel cells forming a fuel cell stack.

Figure 2:
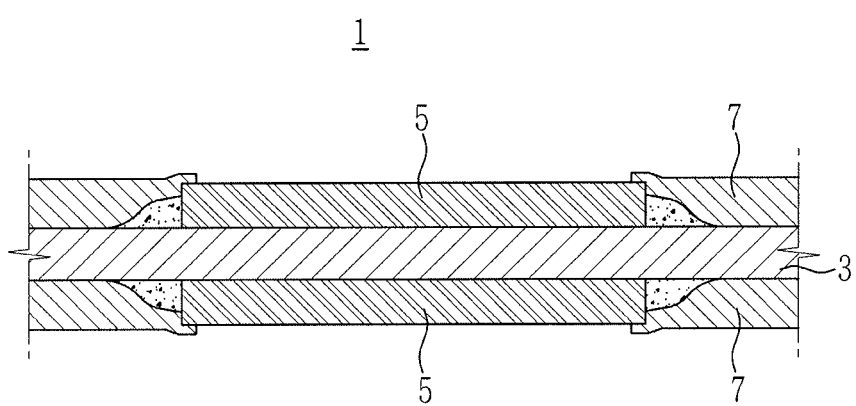
FIG. 2 is a drawing illustrating a membrane-electrode assembly manufactured by a cutting apparatus of a membrane-electrode assembly for a fuel cell according to an exemplary embodiment of the present invention.

The automation system is a core component of a fuel cell. As shown in FIG. 2, electrode catalyst layers 5 are bonded to both surfaces of an electrolyte membrane 3, and the electrolyte membrane 3 is bonded to both sides of the electrode catalyst layer 5, and sub gaskets 7 are bonded to the edge sides of the respective electrode catalyst layers 5 on both sides of the electrolyte membrane sheet 3.

Furthermore, the above-described automation system can automatically and continuously manufacture the membrane-electrode assembly 1 as a roll-to-roll method. The roll-to-roll method is any process of applying coatings, printing, or performing other processes starting with a roll of a flexible material and re-reeling after the process to generate an output roll.

In the present roll-to-roll type automation system, the electrode catalyst layer 5 is formed on both sides of the polymer membrane 3 at regular intervals, the sub-gasket 7 is bonded to the edge of the electrode catalyst layer 5 of the electrolyte membrane 3, and then a membrane-electrode assembly sheet 101 is manufactured.

The automation system includes a step of unwinding the roll-shaped membrane-electrode assembly sheet 101 and cutting the membrane-electrode assembly sheet 101 into a unit form including the electrode catalyst layer 5.

Hereinafter, a roll-to-roll feeding facility in which a roll wound in a roll form is continuously fed in a roll-to-roll manner will be referred to as an example. The roll-to-roll feeding facility may be defined as a plurality of transport rollers rotatably disposed on the facility frame 103 provided in the up, down, back and left and right and left directions.

Each constituent element to be described below may be configured in the facility frame 103 as described above. The facility frame 103 supports each constituent element and may include one frame or a frame divided into two or more.

The facility frame 103 includes various sub-elements such as brackets, bars, rods, plates, housings, cases, and blocks to support each constituent element.

However, since the above-described various sub-elements are provided for mounting the respective components to be described below in the facility frame 103, in the exemplary embodiment of the present invention, the above-mentioned sub-elements are collectively referred to as a facility frame 103 except for exceptional cases.

In a process of cutting the membrane-electrode assembly sheet 101, the membrane-electrode assembly sheet 101 is cut through the cutting apparatus 100 to produce a unit-type membrane-electrode assembly 1.

The cutting process may be performed after a heat treatment process in which the electrode catalyst layer 5 of the membrane-electrode assembly sheet 101 is pressurized at a high temperature and a high pressure.

The cutting apparatus 100 of the membrane-electrode assembly for a fuel cell according to the exemplary embodiment of the present invention is configured in the facility frame 103. The cutting apparatus 100 has a structure configured for preventing micro-vibration or shaking due to the transfer of the membrane-electrode assembly 101.

Also, in the exemplary embodiment of the present invention, the cutting position of the membrane-electrode assembly sheet 101 is automatically corrected according to the position of the electrode catalyst layer 5 in the membrane-electrode assembly sheet 101, and thus the unit-type membrane-electrode assembly 1 may be produced with a predetermined size.

For this, the cutting apparatus 100 for a fuel cell membrane-electrode assembly according to an exemplary embodiment of the present invention basically includes a cutting press 10, a position aligning unit 20, a protective film supply unit 30, a gripper module 40, a gripper driving unit 60, and a vision sensor unit 80.

In an exemplary embodiment of the present invention, the cutting press 10 is for cutting the unit-type membrane-electrode assembly 1 at the membrane-electrode assembly sheet 101 conveyed along a set feeding path.

Figure 3:
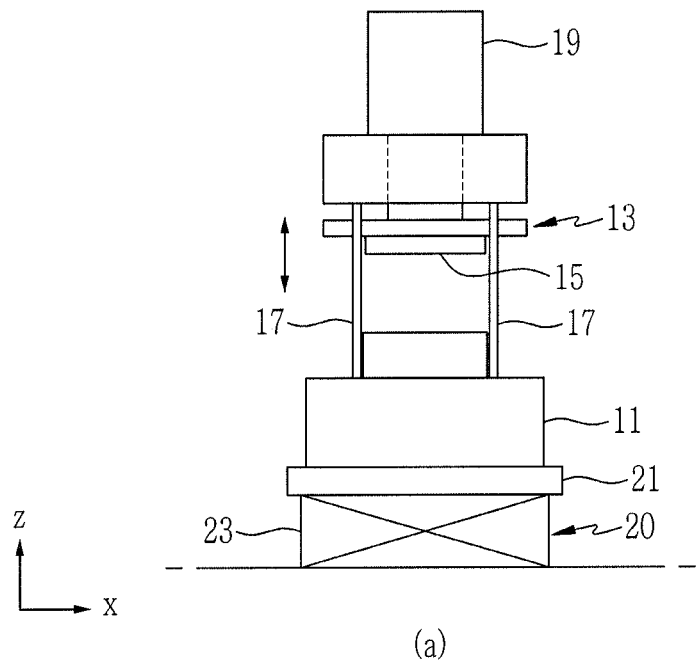
FIG. 3 is a drawing showing a cutting press and a position aligning unit applied to a cutting apparatus of a membrane-electrode assembly for a fuel cell according to an exemplary embodiment of the present invention.
Figure 3:
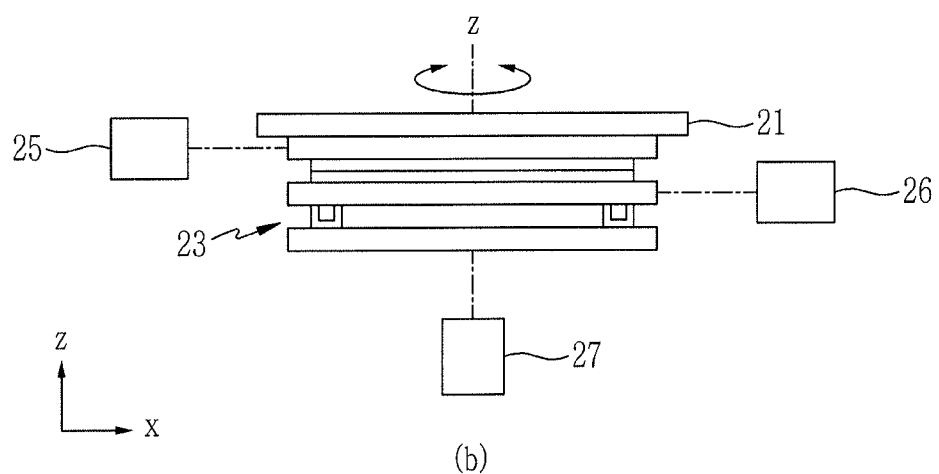

FIG. 3 is a drawing showing the cutting press and the position aligning unit applied to the cutting apparatus of a membrane-electrode assembly for a fuel cell according to an exemplary embodiment of the present invention.

Referring to the previously disclosed figures and FIG. 3, the cutting press 10 is disposed in the facility frame 103 at the rear side of the heat treatment facility mentioned above.

The cutting press 10 is provided with a cutting die 11 provided below the feeding path of the membrane-electrode assembly sheet 101 in the X-axis direction of the drawing, and a driving cutter 13 disposed on the cutting die 11 to be vertically reciprocable.

The cutting die 11 is disposed on the facility frame 103 and supports the membrane-electrode assembly sheet 101 on the lower side of the membrane-electrode assembly 101 feeding path.

The driving cutter 13 cuts the membrane-electrode assembly sheet 101 supported on the cutting die 11 to produce the unit-type membrane-electrode assembly 1, and is disposed on the cutting die 11 on the upper side of the feeding path to reciprocate in the up-and-down direction (Z-axis direction in the figure).

The driving cutter 13 includes a cutter assembly 15 that cuts the membrane-electrode assembly sheet 101 to form the unit-type membrane-electrode assembly 1.

The driving cutter 13 is connected to the cutting die 11 through a support rod 17 and is guided along the support rod 17 by an operation of a press drive source 19 to be reciprocally movable upward and downward.

The position aligning unit 20 is configured to adjust the position of the cutting press 10 according to the position of the electrode catalyst layer 5 of the membrane-electrode assembly 101 detected by the vision sensor unit 80 (see FIG. 1).

The position aligning unit 20 includes a UVW stage 23 disposed in the facility frame 103 and coupled with the cutting die 11 through a base plate 21. The UVW stage 23 moves the base plate 21 in X-axis and Y-axis directions on a XY plane (see FIG. 4) and rotates about Z-axis direction perpendicular to the XY plane. In the instant case, the X-axis direction is the feeding direction, and the Y-axis direction is a perpendicular direction of the feeding direction.

For example, the UVW stage 23 may include a UVW driver which moves the base plate 21 on the XY plane in the X-axis and Y-axis directions rotates the base plate 21 about Z-axis direction.

The UVW stage 23 may be a known UVW stage aligning device that aligns a predetermined element in the X-axis direction and the Y-axis direction and aligns in the Z-axis through the UVW driver, and detailed description will be omitted.

On the other hand, referring to FIG. 1, the protective film supply unit 30 is for supplying a protective film 32 between the cutting die 11 and the membrane-electrode assembly sheet 101.

The protective film supply unit 30 can prevent the driving cutter 13 from being damaged by the cutting die 11 through the protective film 32 when the membrane-electrode assembly sheet 101 is placed between the cutting die 11 of the cutting press 10 and the driving cutter 13 and the membrane-electrode assembly sheet 101 is cut through the driving cutter 13, The protective film supply unit 30 includes a film unwinder 31, a film rewinder 33, and guide rollers 35.

The film unwinder 31 is rotatably disposed in the facility frame 103. The film unwinder 31 unwinds the protective film 32 wound in a form of a roll between the cutting die 11 and the membrane-electrode assembly sheet 101.

The film rewinder 33 is rotatably disposed in the facility frame 103. The film rewinder 33 winds the protective film 32 that has passed between the cutting die 11 and the membrane electrode assembly sheet 101.

The guide rollers 35 are rotatably disposed in the facility frame 103. The guide rollers 35 guide the protective film 32 between the cutting die 11 and the membrane-electrode assembly sheet 101.

The protective film 32 supports the lower surface of the membrane-electrode assembly 101 on the cutting die 11 when the membrane-electrode assembly sheet 101 is cut through the driving cutter 13. The protective film 32 is configured to prevent the cutter assembly of the driving cutter 13 from contacting the upper surface of the cutting die 11 through the membrane-electrode assembly sheet 101 do.

Figure 4:
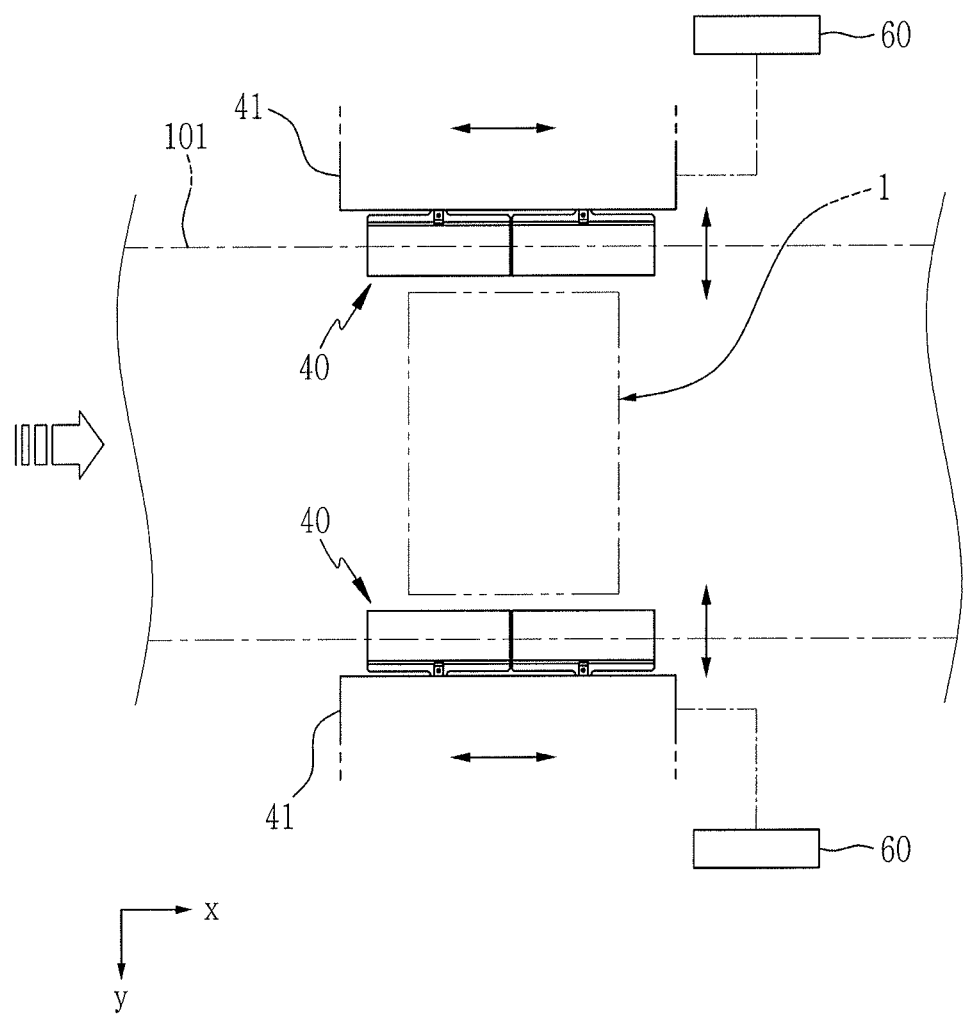
FIG. 4 is a drawing illustrating a gripper module applied to a cutting apparatus of a membrane-electrode assembly for a fuel cell according to an exemplary embodiment of the present invention.

FIG. 4 is a drawing illustrating a gripper module applied to a cutting apparatus of a membrane-electrode assembly for a fuel cell according to an exemplary embodiment of the present invention.

Referring to FIG. 4, the gripper module 40 is for gripping both side edge portions of the membrane-electrode assembly sheet 101.

The gripper module 40 applies tension to the membrane-electrode assembly sheet 101 in a direction perpendicular to the feeding direction of the membrane-electrode assembly sheet 101 (Y-axis direction in the figure) before cutting the membrane-electrode assembly sheet 101 and moves along the feeding direction of the assembly sheet 101.

A plurality of gripper modules 40 are disposed in the facility frame 103 through a base member 41 at predetermined intervals along the feeding direction of the membrane-electrode assembly sheet 101.

The base member 41 is provided in a form of a bracket having a predetermined length and is disposed on both sides along the feeding direction of the membrane-electrode assembly sheet 101.

Figure 5:
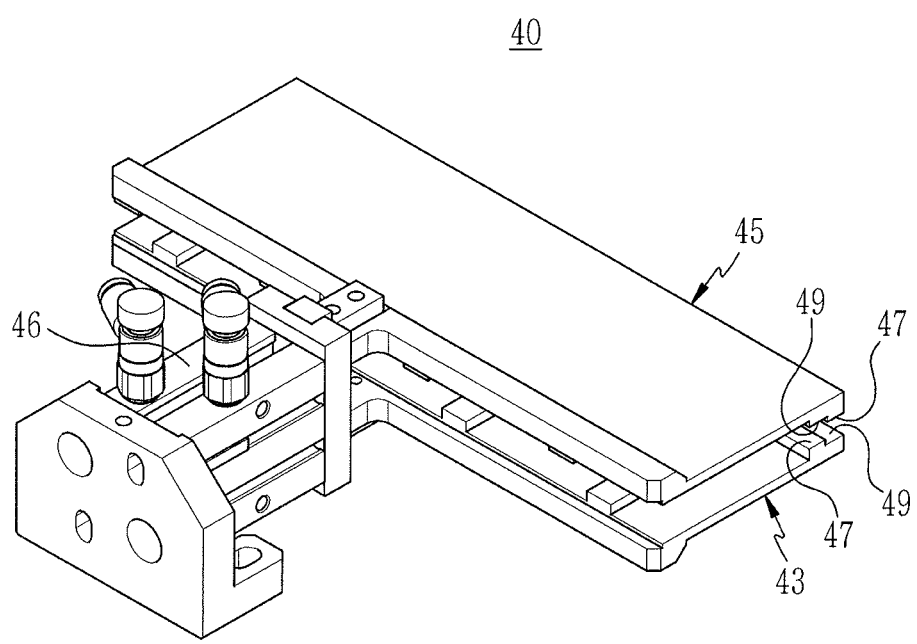
FIG. 5 is a perspective view showing a gripper module applied to a cutting apparatus of a membrane-electrode assembly for a fuel cell according to an exemplary embodiment of the present invention.
Figure 6:
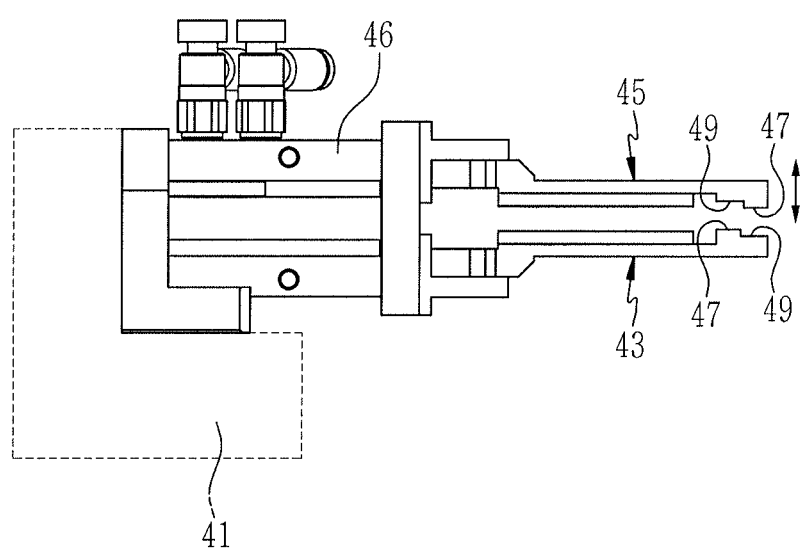
FIG. 6 is a side view exemplarily illustrating a gripper module applied to a cutting apparatus of a membrane-electrode assembly for a fuel cell according to an exemplary embodiment of the present invention.
Figure 7:
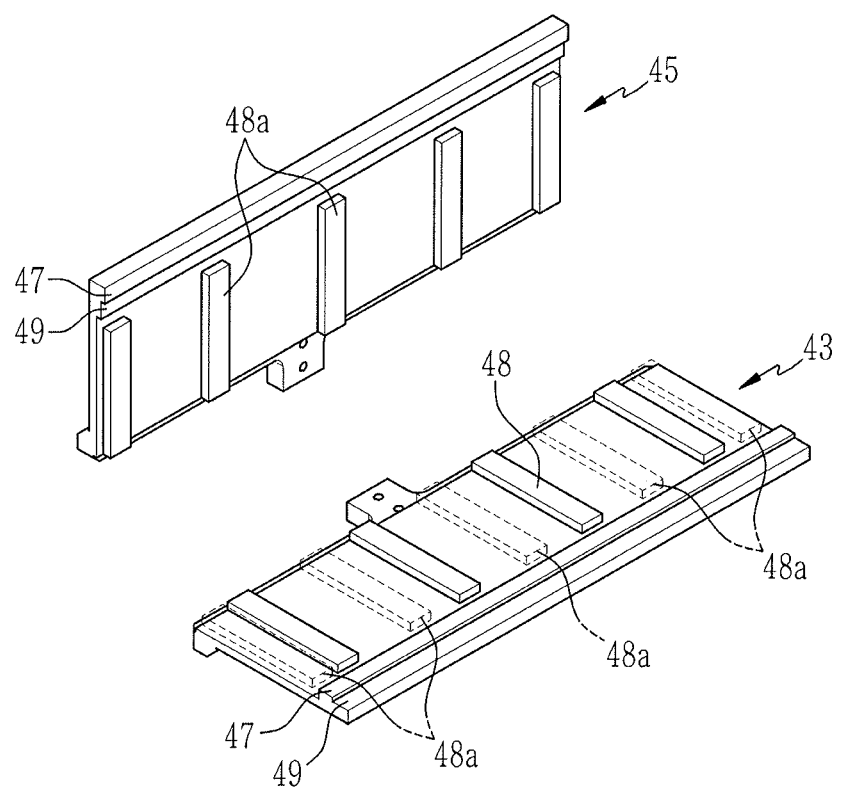
FIG. 7 is a drawing illustrating a stationary gripper body and an operating gripper body of a gripper module applied to a cutting apparatus of a membrane-electrode assembly for a fuel cell according to an exemplary embodiment of the present invention.

FIG. 5 is a perspective view showing a gripper module applied to a cutting apparatus of a membrane-electrode assembly for a fuel cell according to an exemplary embodiment of the present invention and FIG. 6 is a side view exemplarily illustrating a gripper module applied to a cutting apparatus of a membrane-electrode assembly for a fuel cell according to an exemplary embodiment of the present invention.

Referring to FIG. 5 and FIG. 6, an exemplary embodiment of the present invention, the gripper module 40 includes a stationary gripper body 43 and an operating gripper body 45.

The stationary gripper body 43 is mounted on the base member 41. The operating gripper body 45 is connected to a first operating cylinder 46 mounted on the base member 41 and is selectively actuated by the operation of the first operating cylinder 46 for selectively gripping the edges of the electrode assembly sheet 101 together with the stationary gripper body 43.

Here, the first operating cylinder 46 provides the actuation force to the operating gripper body 45, and may be a drive cylinder providing pneumatic force well-known in the art, and a detailed description thereof will be omitted.

The stationary gripper body 43 and the operating gripper body 45 may be long rectangles and are disposed along the feeding direction of the membrane electrode assembly sheet 101 as shown in FIG. 4.

The stationary gripper body 43 and the operating gripper body 45 are provided with gripping projections 47 and gripping grooves 47 for gripping both side edge portions of the membrane electrode assembly sheet 101 in the vertical direction, and the gripping projections 47 and the gripping grooves 47 49 are formed stepwise along the feeding direction of the membrane-electrode assembly sheet 101.

The gripping protrusions 47 and the gripping grooves 49 are formed to correspond to the end portions of the stationary gripper body 43 and the operating gripper body 45 corresponding to both side edge portions of membrane electrode assembly sheet 101.

For example, in the stationary gripper body 43, the gripping groove 49 is elongated along the feeding direction of the membrane-electrode assembly sheet 101 at the end of the stationary gripper body 43. and the gripping projections 47 are elongated along the feeding direction of the membrane-electrode assembly sheet 101 inside the gripping grooves 49.

In the operating gripper body 45, the gripping protrusion 47 is formed at the end of the operating gripper body 45 along the feeding direction of the membrane-electrode assembly sheet 101, and the gripping groove 49 is formed is formed along the feeding direction of the assembly sheet 101 internal to the gripping protrusion 47.

Supporting protrusions 48, 48a may be formed on the stationary gripper body 43 and the operating gripper body 45 to support both side edges of the membrane electrode assembly sheet 101, and may be formed at predetermined intervals along a direction perpendicular to the feeding direction of the membrane electrode assembly sheet 101.

That is, in the stationary gripper body 43, support protrusions 48 are formed inside the gripping protrusion 47, and support protrusions 48a in the operating gripper body 45 are formed inside the gripping groove 49.

The support protrusions 48 and 48a may be staggered, that is, asymmetrically formed in the stationary gripper body 43 and the operating gripper body 45 so that both side edge portions of the membrane-electrode assembly sheet 101 are staggered.

The support protrusions 48 and 48a are disposed at predetermined intervals along the feeding direction of the membrane-electrode assembly sheet 101 to the stationary gripper body 43 and the movable gripper body 45. The support protrusions 48 and 48a are disposed in a non-face-to-face relationship with respect to the stationary gripper body 43 and the operating gripper body 45 respectively.

That is, when gripping both side edge portions of the membrane-electrode assembly sheet 101 through the stationary gripper body 43 and the operating gripper body 45, the support protrusions 48 and 48a are parallel and do not face each other.

Figure 8:
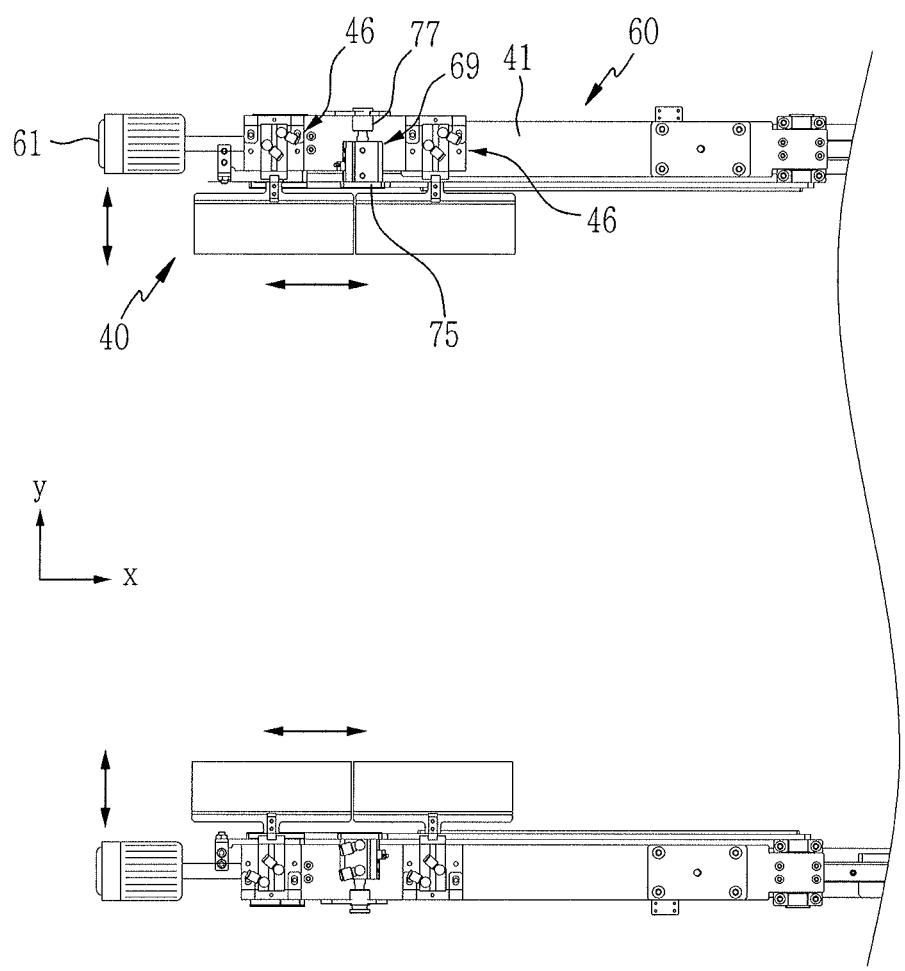
FIG. 8 and FIG. 9 are drawings illustrating a gripper driving unit applied to a cutting apparatus of a membrane-electrode assembly for a fuel cell according to an exemplary embodiment of the present invention.
Figure 9:
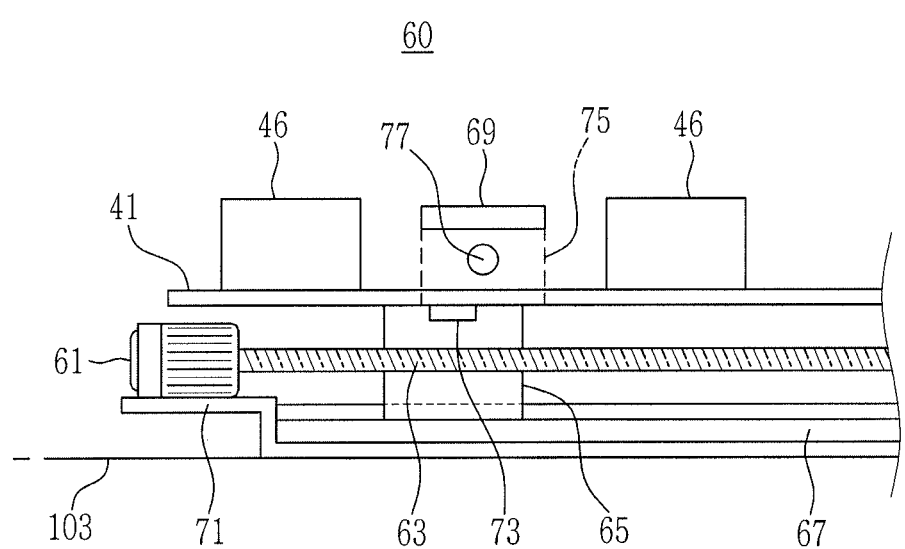

FIG. 8 and FIG. 9 are drawings illustrating a gripper driving unit applied to a cutting apparatus of a membrane-electrode assembly for a fuel cell according to an exemplary embodiment of the present invention.

Referring to FIG. 4 with FIG. 8 and FIG. 9, the gripper driving unit 60 is configured to move the base member 41 in which the gripper modules 40 are disposed in a direction perpendicular to the feeding direction of the membrane electrode assembly sheet 101, that is, in the Y-axis direction and in the feeding direction of the membrane electrode assembly sheet 101, that is, in the X-axis direction.

The gripper driving unit 60 is configured on both sides of the feeding path of the membrane-electrode assembly sheet 101 corresponding to the above-mentioned base member 41 respectively. The gripper driving unit 60 includes a servo motor 61, a lead screw 63, a moving block 65, and a guide block 67 for reciprocating the base member 41 along the X-axis direction, i.e., in the feeding direction of the membrane-electrode assembly sheet 101.

The gripper driving unit 60 includes a second operating cylinder 69 for reciprocating the base member 41 in a direction perpendicular to the feeding direction of the membrane-electrode assembly sheet 101, that is, in the Y-axis direction.

The servo motor 61 may be a servo motor of known technology configured for servo control in rotation speed and rotating direction. The servo motor 61 is disposed on a mounting bracket 71 disposed along the feeding direction of the membrane-electrode assembly sheet 101 on both sides of the feeding path of the membrane-electrode assembly sheet 101 in the facility frame 103.

The lead screw 63 is connected to a driveshaft of the servo motor 61. The moving block 65 is a block divided into one or two or more, and is screwed with the lead screw 63.

The base member 41 is slidably coupled to the moving block 65 in a direction perpendicular to the feeding direction of the membrane-electrode assembly sheet 101. A guide rail 73 to which the base member 41 may be slidably engaged is disposed in the moving block 65 along a direction perpendicular to the feeding direction of the membrane-electrode assembly sheet 101.

The guide block 67 is disposed on the mounting bracket 71 along the feeding direction of the membrane-electrode assembly sheet 101. In the guide block 67, the moving block 65 is slidably coupled along the feeding direction of the membrane-electrode assembly sheet 101.

In the exemplary embodiment of the present invention, the second operating cylinder 69 is for applying a forward/backward actuating force to the base member 41 in the direction perpendicular to the feeding direction of the membrane-electrode assembly sheet 101 and may be a pneumatic cylinder using pneumatic.

The second operating cylinder 69 is fixed to the moving block 65 through a fixing bracket 75. and the second operating cylinder 69 may be connected to the base member 41 via an actuating rod 77.

When the actuating rod 77 of the second operating cylinder 69 is moved back and forth, the base member 41 on which the gripper modules 40 are mounted is guided along the guide rail 73 on the moving block 65 in a direction perpendicular to the feeding direction of the electrode assembly sheet 101.

Referring to FIG. 1, the vision sensor unit 80 is for detecting the position of the electrode catalyst layer 5 of a membrane-electrode assembly (unit type) to be cut by the cutting press 10 at the membrane-electrode assembly sheet 101.

The vision sensor unit 80 is disposed in the facility frame 103 to be reciprocally movable between the cutting die 11 and the driving cutter 13 of the cutting press 10. The vision sensor unit 80 may include, for example, a sensor for detecting the position of the electrode catalyst layer 5 in the X-axis direction and a sensor for detecting the position of the electrode catalyst layer 5 in the Y-axis direction.

The vision sensor unit 80 is configured to be reciprocally movable along the feeding direction of the membrane-electrode assembly 101 through a driving unit 81. The driving unit 81 is made up of a known moving device including a servo motor and LM guide structure and provides a forward and backward actuation force for the vision sensor portion 80.

The vision sensor units 80 may be connected to a bracket, and the bracket may be slidably coupled to a guide rail mounted on the facility frame 103. The vision sensor unit 80 takes a vision image of the electrode catalyst layer 5 and outputs the vision data to the controller 90. For example, the vision sensor unit 80 may acquire position data of the electrode catalyst layer 5 by visually photographing vertexes of the electrode catalyst layer 5.

In an exemplary embodiment of the present invention, the controller 90 is a controller that is configured to control the overall operation of the apparatus 100. The controller 90 may be implemented as one or more control processors operating according to a set program and include a series of instructions for performing the contents according to exemplary embodiments of the present invention.

The controller 90 analyzes the vision data provided from the vision sensor unit 80 to detect the position of the electrode catalyst layer 5. and when it is determined that the detected position of the electrode catalyst layer 5 does not satisfy the predetermined reference range, the control signal is applied to the position aligning unit 20 mentioned above.

Here, the reference range means the allowable position value of the driving cutter 13 set to cut the unit-type membrane-electrode assembly 1 in the membrane-electrode assembly sheet 101 to the set standard.

Hereinafter, the operation of the cutting apparatus 100 of the membrane-electrode assembly for a fuel cell according to the exemplary embodiment of the present invention and the method of cutting the membrane-electrode assembly for a fuel cell using the cutting apparatus 100 will be described below in detail with reference to the drawings.

Figure 10:
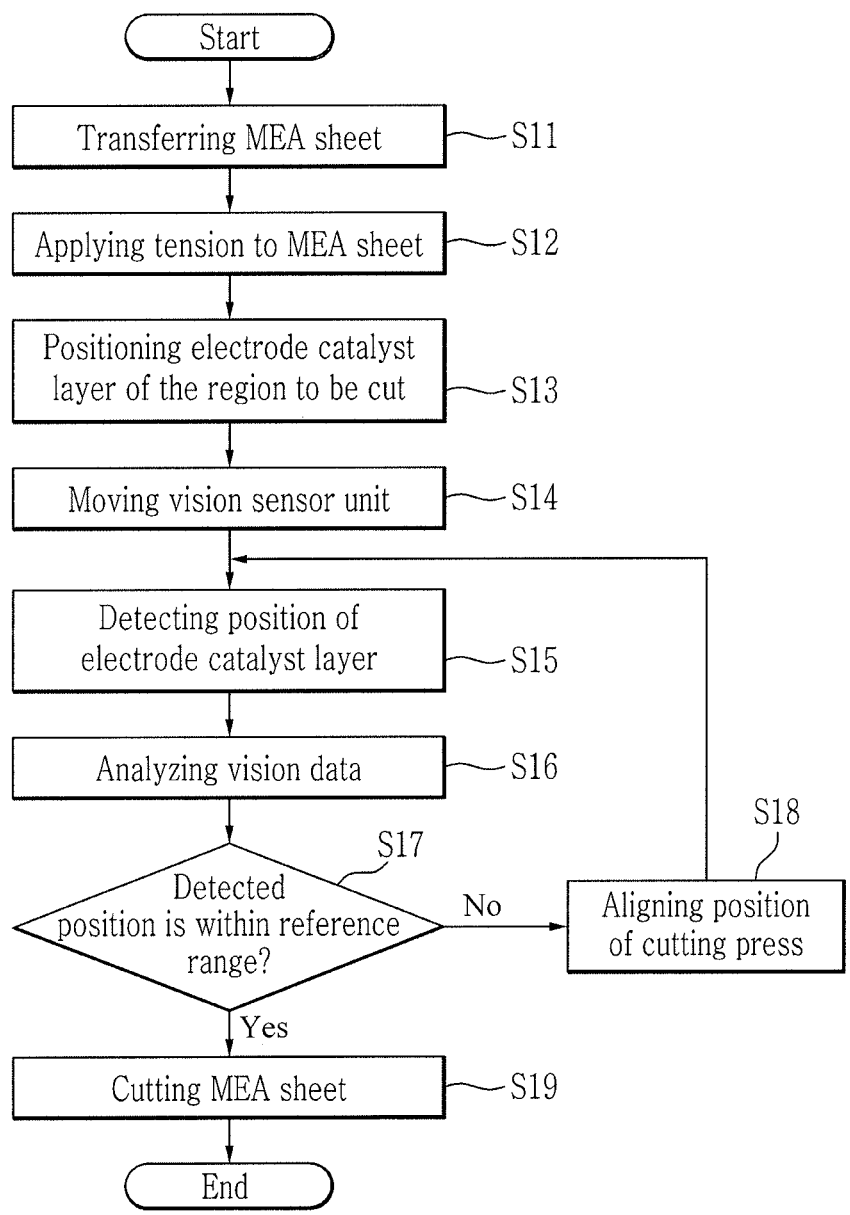
FIG. 10 is a flow chart for explaining an operation of a membrane-electrode assembly cutting apparatus configured for a fuel cell according to an exemplary embodiment of the present invention, and a cutting method of a membrane-electrode assembly for a fuel cell using the cutting apparatus.

FIG. 10 is a flow chart for explaining an operation of a membrane-electrode assembly cutting apparatus configured for a fuel cell according to an exemplary embodiment of the present invention, and a cutting method of a membrane-electrode assembly for a fuel cell using the cutting apparatus.

Referring to the drawings, the membrane-electrode assembly sheet 101 having undergone a heat treatment process is transferred to the cutting press 10 side of the membrane-electrode assembly cutting process along the feeding path established through a transfer means of the known technique (S11).

Here, the driving cutter 13 of the cutting press 10 is moved upward by the press driving source 19 with respect to the cutting die 11. The vision sensor unit 80 is positioned on the external side (front side of the cutting press 10) between the cutting die 11 and the driving cutter 13 by the drive unit 81. in the instant state, the membrane-electrode assembly sheet 101 is transferred between the cutting die 11 and the driving cutter 13 along the feeding path.

In the instant case, the gripper modules 40 are in a state in which the gripping of the membrane-electrode assembly sheet 101 is released through the stationary gripper body 43 and the operating gripper body 45 by the backward operation of the first operating cylinder 46.

The gripper modules 40 are in a state of being moved toward both side edges of the membrane-electrode assembly sheet 101 through the base member 41 by the backward movement of the second operating cylinder 69. At the instant time, the gripper modules 40 are positioned on the front side of the cutting press 10.

In a process of transferring the membrane-electrode assembly sheet 101 to the cutting press 10, the gripper modules 40 move the operating gripper body 45 in the downward direction by the forward operation of the first operating cylinder 46. Accordingly, both side edges of the membrane-electrode assembly sheet 101 are gripped through the stationary gripper body 43 and the operating gripper body 45 of the gripper modules 40.

As such, the gripper modules 40 are moved in the direction perpendicular to the feeding direction of the membrane-electrode assembly sheet 101 through the base member 41 by the forward operation of the second operating cylinder 69. That is, the membrane-electrode assembly sheet 101 is pulled outward in the width direction of the membrane-electrode assembly sheet 101.

Therefore, as the gripper modules 40 move outward in the width direction of the membrane-electrode assembly 101 in a state in which both side edges of the membrane-electrode assembly sheet 101 are gripped, tension may be applied to the membrane-electrode assembly sheet 101 (S12).

Next, the servo motor 61 is driven to move the gripper modules 40 through the base member 41 for a predetermined time period along the feeding direction of the membrane-electrode assembly sheet 101.

At the instant time, the gripper modules 40 are synchronized with the feeding speed of the membrane-electrode assembly sheet 101 and move for a predetermined interval along the feed direction of the membrane-electrode assembly sheet 101.

The gripping portion section of the membrane-electrode assembly sheet 101 by the gripper modules 40 is positioned between the cutting die 11 of the cutting press 10 and the driving cutter 13.

That is, the electrode catalyst layer 5 of the region (unit type membrane-electrode assembly) to be cut by the cutting press 10 is positioned between the cutting die 11 and the driving cutter 13 at a predetermined position (S13).

The stationary gripper body 43 and the operating gripper body 45 of the gripper module 40 are rectangular plate type and continuously grip the opposite side edge portions of the membrane electrode assembly sheet 101 along the feeding direction thereof.

The stationary gripper body 43 and the operating gripper body 45 of the gripper module 40 are fixed to both the side edges of the membrane electrode assembly 101 through the gripping projections 47 and the gripping grooves 49.

Furthermore, the stationary gripper body 43 and the operating gripper body 45 of the gripper module 40 support the opposite side edge portions of the membrane-electrode assembly sheet 101 through the support protrusions 48 and 48a.

Therefore, the stationary gripper body 43 and the operating gripper body 45 of the gripper module 40 stably grasp both side edges of the membrane-electrode assembly sheet 101 and thus the tension may be easily applied to the assembly sheet 101.

In the state where the gripping portion (or section) of the membrane-electrode assembly sheet 101 by the gripper modules 40 is positioned between the cutting die 11 and the driving cutter 13 of the cutting press 10 as described above, the vision sensor unit 80 is moved between the cutting die 11 and the driving cutter 13 along the feeding direction of the membrane-electrode assembly sheet 101 through the driving unit 81 (S14).

As such, the position of the electrode catalyst layer 5 of the membrane electrode assembly sheet 101 is detected through the vision sensor unit 80, and the sensing signal is output to the controller 90 (S15). In step S15, the vertexes of the electrode catalyst layer 5 are visually photographed through vision sensor unit 80, and the vision data is output to the controller 90.

The controller 90 analyzes the vision data provided from the vision sensor unit 80 to detect the position of the electrode catalyst layer 5 (S16). As such, the controller 90 determines that the position detection value of the electrode catalyst layer 5 satisfies a predetermined reference range (S17).

In step S17, the controller 90 applies a control signal (operation control signal) to the position aligning unit 20 when it is determined that the detected position of the electrode catalyst layer 5 is within the reference range.

The position aligning unit 20 corrects the position of the cutting press 10 in the X-axis direction, the Y-axis direction, and the angle about Z-Axis direction on the XY plane through the UVW stage 23 in accordance with the detection position of the electrode catalyst layer 5 (S18).

That is, in step S18, the position aligning unit 20 is operated through the controller 90 according to the detection signal of the vision sensor unit 80 so that the cutting position of the cutting press 10 is corrected according to the detection position of the electrode catalyst layer 5.

If it is determined in step S17 that the position detection value of the electrode catalyst layer 5 satisfies the predetermined reference range, the vision sensor unit 80 performs the following process.

As a result of this, the vision sensor unit 80 is moved along the opposite direction of the feeding direction of the membrane-electrode assembly sheet 101 through the driving unit 81 to the original position.

As such, the driving cutter 13 is moved downwards through the press driving source 19, and the membrane-electrode assembly sheet 101 is cut to form in a unit shape including the electrode catalyst layer 5 (S19).

After the position of the cutting press 10 is adjusted to match the detection position of the electrode catalyst layer 5 of the membrane-electrode assembly sheet 103, the membrane-electrode assembly sheet 103 is cut through the movable cutter 13 to a predetermined size.

In the instant case, the membrane-electrode assembly sheet 101 is cut through the cutter assembly 15 of the driving cutter 13 while the membrane-electrode assembly sheet 101 is supported on the upper surface of the cutting die 11.

Before cutting the membrane-electrode assembly sheet 103, the protective film 32 is supplied to the space between the cutting die 11 and the membrane-electrode assembly sheet 101 through the protective film supply unit 30.

In the present process, the protective film 32 wound in a form of a roll is unwound between the cutting die 11 and the membrane-electrode assembly sheet 101 through the film unwinder 31 through the guide rollers 35.

Therefore, when cutting the membrane-electrode assembly sheet 101, it is possible to prevent the cutter assembly 15 from being damaged by the cutting die 11 by blocking the contact through the protective film 32.

After the membrane-electrode assembly sheet 11 as described above, the driving cutter 13 is moved upward by the press driving source 19.

In the present process, the gripper module 40 is moved toward both side edges of the membrane-electrode assembly sheet 101 through the base member 41 by the backward operation of the second operating cylinder 69.

At the same time, the gripping of the membrane-electrode assembly sheet 101 is released through the stationary gripper body 43 and the operating gripper body 45 by the backward operation of the first operating cylinder 46.

Next, the gripper modules 40 are moved in the direction opposite to the feeding direction of the membrane-electrode assembly sheet 101 through the base member 41 by driving the servo motor 61 and return to the initial position.

In the present process, the protective film 32 supplied between the cutting die 11 and the membrane electrode assembly sheet 101 through the film unwinder 31 and the guide rollers 35 of the protective film supply unit 30 is wound around the film rewinders 33.

As such, the protective film 32 is supplied again between the cutting die 11 and the membrane-electrode assembly sheet 101 through the film unwinder 31 and the guide rollers 35.

Accordingly, the above-described series of steps is repeated and the unit-type membrane-electrode assembly 1 may be cut into a predetermined standard from the membrane-electrode assembly sheet 101.

On the other hand, as a process after completion of the cutting to produce the membrane-electrode assembly 1 as described above, scrap of the membrane-electrode assembly sheet 101 is cut through the scrap cutter 111 and expelled to a scrap discharging portion 113 through a conveyor 112.

In the present process, the cut-off electrode assembly 1 is discharged to the component discharge portion 114 and the membrane-electrode assembly 1 discharged to the component discharging portion 114 is taken out to the inspection die 116 through a first take-out robot 115a.

Thereafter, the quality of the film-electrode assembly 1 mounted on the inspection die 116 is checked through an inspection vision 117. At the instant time, the membrane-electrode assembly 1 judged as an adequate product is loaded into an adequate product magazine 118 by a second take-out robot 115b, and the membrane-electrode assembly 1 judged as defective product is loaded into a defective product magazine 119 by the second take-out robot 115b.

According to the cutting apparatus 100 and method of the membrane-electrode assembly for a fuel cell according to the exemplary embodiment of the present invention as described above, since the tension is applied to the membrane-electrode assembly sheet 101 through the gripper module 40, and thus minute vibrations or shaking due to the transfer of the membrane-electrode assembly sheet 101 may be prevented.

According to the exemplary embodiment of the present invention, the cutting position of the cutting press 10 may be changed according to the position of the electrode catalyst layer 5 in the membrane-electrode assembly sheet 101 through the vision sensor unit 80 and the position aligning unit 20 and thus the membrane-electrode assembly 1 may be cut to a predetermined standard.

Therefore, it is possible to eliminate the possibility of serpentine deformation due to minute vibrations or shaking in transferring of the membrane-electrode assembly sheet 101.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A cutting apparatus of membrane electrode assembly for a fuel cell, which is configured for transferring a membrane electrode assembly sheet including an electrolyte membrane, electrode catalyst layers bonded to a first surface and a second surface of the electrolyte membrane and sub gaskets attached to the electrolyte membrane and edges of the electrode catalyst layers in a roll-to-roll manner along a feeding path and for cutting the membrane-electrode assembly sheet to produce a unit-type membrane-electrode assembly, the cutting apparatus comprising:

a cutting press including a cutting die disposed on a lower side of the feeding path and a driving cutter configured to be upwardly and downwardly movable on the cutting die at an upper side of the feeding path, and the cutting press disposed on a facility frame;

a plurality of gripper modules disposed on the facility frame through a base member along a feeding direction of the membrane-electrode assembly sheet, and gripping first and second side edges of the membrane-electrode assembly sheet; and a gripper driving unit disposed in the facility frame and moving the base member in a direction perpendicular to the feeding direction of the membrane-electrode assembly sheet and along the feeding direction of the membrane-electrode assembly sheet, wherein each of the gripper modules includes:

a stationary gripper body fixedly mounted on the base member; and an operating gripper body coupled to a first operating cylinder mounted on the base member and configured for selectively gripping the first and second edges of the membrane-electrode assembly sheet with the stationary gripper body, wherein a gripping protrusion and a gripping groove for gripping predetermined portions of the membrane-electrode assembly sheet in a stepped manner are formed at the stationary gripper body and the operating gripper body respectively, and wherein supporting protrusions for supporting the first and second side edges of the membrane-electrode assembly sheet are formed at the stationary gripper body and the operating gripper body respectively.

2. The cutting apparatus of claim 1,
wherein the stationary gripper body and the operating gripper body are formed in a shape of rectangular plate on a top view thereof and are disposed along the feeding direction.

3. The cutting apparatus of claim 1,
wherein the support protrusions are disposed at predetermined intervals in the feeding direction and formed to extend along a direction perpendicular to the feeding direction of the membrane electrode assembly sheet.

4. The cutting apparatus of claim 1, wherein the gripper driving unit includes:

a motor fixedly mounted on a mounting bracket disposed along the feed direction in the facility frame;

a leadscrew connected to the motor;

a moving block which is engaged with the lead screw in the feeding direction of the membrane-electrode assembly sheet and is slidably coupled with the base member in a direction perpendicular to the feeding direction of the membrane-electrode assembly sheet;

a guide block fixedly mounted on the mounting bracket and slidably coupled with the moving block along the feeding direction of the membrane-electrode assembly sheet; and a second operating cylinder fixed to the moving block via a fixed bracket, connected to the base member, and configured for applying a forward and backward actuating force to the base member in a direction perpendicular to the feeding direction.

5. The cutting apparatus of claim 4, wherein the base member is slidably coupled to the moving block through a guide rail in a direction perpendicular to the feeding direction.

* * * * *